United States Patent
Strong et al.

[11] Patent Number: 5,918,626
[45] Date of Patent: Jul. 6, 1999

[54] SELF REGULATING QUARTER TURN FAUCET VALVE WITH NO METAL COMPONENTS

[75] Inventors: L. W. Strong, Birmingham; Peter J. Taylor, Bishops Wood, both of United Kingdom

[73] Assignee: Delta Engineering Holdings Limited, London, United Kingdom

[21] Appl. No.: 08/774,434

[22] Filed: Dec. 30, 1996

[51] Int. Cl.[6] ........................................... F16K 11/00
[52] U.S. Cl. .................. 137/454.5; 251/288; 137/625.31
[58] Field of Search .................................... 251/208, 288; 137/625.31, 625.3, 454.6, 454.5, 454.2

[56] References Cited

U.S. PATENT DOCUMENTS

| | | | |
|---|---|---|---|
| 2,923,318 | 2/1960 | Monson | 137/625.31 |
| 3,780,758 | 12/1973 | DeVries | 137/454.6 |
| 3,831,621 | 8/1974 | Anthony et al. | 137/625.31 |
| 4,700,928 | 10/1987 | Marty | 251/208 |
| 4,793,375 | 12/1988 | Marty | 251/208 |
| 4,821,765 | 4/1989 | Iqbal | 137/625.31 |
| 4,924,903 | 5/1990 | Orlandi | 137/625.31 |
| 4,944,330 | 7/1990 | Sakakibara | 137/625.31 |
| 5,094,258 | 3/1992 | Orlandi | 137/625.31 |
| 5,348,042 | 9/1994 | Wagner | 251/208 |
| 5,398,717 | 3/1995 | Goncze | 251/288 |

*Primary Examiner*—Denise L. Ferensic
*Assistant Examiner*—Ramyar Farid
*Attorney, Agent, or Firm*—Womble Carlyle Sandridge & Rice; Louis T. Isaf

[57] ABSTRACT

An self-regulating quarter turn faucet valve is fabricated entirely of non-metal parts for use in purified and distilled water dispensing faucets. The valve has wall dimensions that are designed to withstand the torque and tensile forces generated when the valve is threaded into a faucet receptacle and has key operational components located in non-stressed areas of the valve to prevent destructive shear forces during operation. A stacked polished ceramic disc arrangement is used to shut the valve on and off through rotation of the discs relative to each other to align and misalign wing-shaped openings formed in the discs.

1 Claim, 3 Drawing Sheets

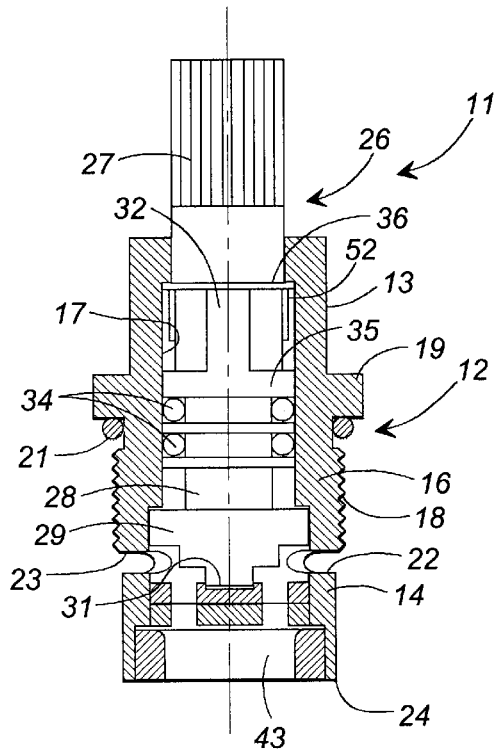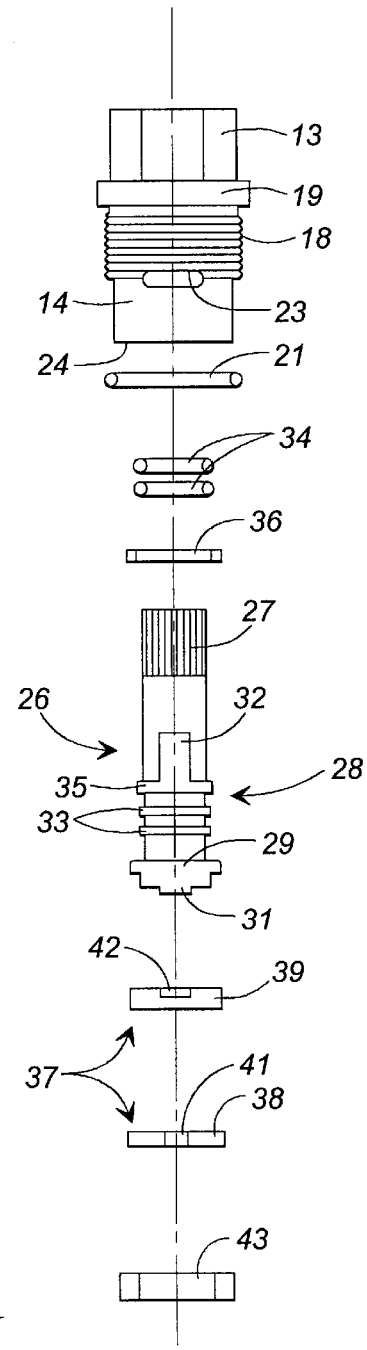

SELF REGULATING QUARTER TURN FAUCET VALVE WITH NO METAL COMPONENTS

TECHNICAL FIELD

This invention relates generally to water faucets and more specifically to valves for operating and controlling the flow of water from purified drinking water faucets.

BACKGROUND OF THE INVENTION

Various designs of valves for operating and controlling the flow of water from domestic water faucets have been implemented through the years. In one common valve design, a threaded valve stem is configured to be manually treaded into and out of a valve body. The interior end of the valve stem is provided with a replacable rubber washer or pad that is driven into sealing engagement with the mouth of a water supply passageway when the valve stem is threaded into the valve body. This functions to shut off the flow of water through the valve and thus turns off the faucet. When the valve stem is threaded out of the valve body, the washer is drawn progressively away from the mouth of the passageway allowing water to flow through the faucet. The magnitude of the flow is determined by the distance between the washer and the passageway mouth. Thus, the flow rate from the faucet is controlled by threading the valve stem out of the valve body until the desired flow rate is achieved. These types of faucet valves are used extensively in kitchen, bathroom, and garden faucets and usually are made of brass that can be plated with, for example, a nickel alloy. In addition, faucets for use in kitchens and baths are often provided with auxiliary aerators at the faucet tip for regulating the flow of water to a predetermined maximum rate. This is because the natural flow rate that results when the valve is opened usually is too strong for the purposes of such faucets.

Another type of valve typical in domestic faucets includes a ball that fits within a socket through which hot and cold water supply passageways extend. The ball has one or more openings that communicate with the spigot of the faucet. A handle extending outwardly from the faucet can be used to control the position of the ball within the socket to align or misalign the openings in the ball with those in the socket. When the openings are aligned, water flows through the ball and through the spigot. When the openings are misaligned, the ball functions to prevent flow and the faucet is off. A user can manipulate the handle to achieve a desired flow rate and to select a desired water temperature through appropriate mixing of water from the hot and the cold water supplies. In most cases, these types of faucets are also fabricated of brass, plated brass, or other appropriate metal, although in some instances the ball portion of the valve is fabricated of a plastic material and the ball is replaceable. In most cases, these faucets are also provided with aerators at the ends of their spigots to regulate the flow of water to a usable rate.

While these common types of faucet valves have proven successful for kitchen and bathroom faucets, they are not particularly suited to use in drinking water faucets that dispense purified, filtered, and/or distilled water for drinking and cooking. In such faucets, a multi-turn threaded stem type valve is cumbersome to use because water usually is drawn from the faucet in numerous brief bursts to fill glasses or pans that are held in one hand of a user. Further, there generally is no need to have the degree of control over the flow rate that is provided by these multi-turn valves. Instead, it is preferred that the faucet simply be turned on and off quickly, easily, and conveniently. Finally, where distilled or purified water is being dispensed for drinking, the rubber pads or washers of multi-turn valves are highly undesirable because they can degrade over time and can impart impurities to the water as it flows through the valve. Metal components of the valve can also leach metals and metal oxides into the water. For many of these same reasons, ball and socket type valves also are unsuited to use in purified drinking water faucets.

Valves specifically designed for use in purified drinking water faucets have been developed. One such valve, commonly known as a push button valve, can be opened and closed by pressing and releasing a lever attached to the valve. When the lever is pressed, it depresses a spring biased plunger into the valve body and this, in turn, moves a washer or pad away from the mouth of the water supply passageway to permit the flow of water through the faucet. While such a valve is convenient, it nevertheless embodies certain inherent shortcomings. In particular, the push button valve still operates with a rubber or synthetic pad that can leach contaminants into the purified water. Further, metal components such as the plunger and particularly the spring for biasing the plunger are still required. Such metal components, even where plated with a nickel or other alloy are highly undesirable in purified water faucets because purified and distilled water, unlike ordinary tap water, is particularly corrosive to metals. When purified or distilled water contacts a metal surface, the metal is slowly broken down and the metal molecules and oxides of the metal become dissolved in the water. Thus, not only does the water become contaminated with unwanted metals and metal oxides, the metal itself is dissolved over time and eventually must be replaced. This can be a particularly acute problem during long periods of non-use when water within the faucet and valve is subject to prolonged contact with the metal components of the valve.

Another type of valve developed for use with purified water dispensers is the quarter-turn rotary valve. In this valve, a pair of small stacked ceramic discs are positioned in the water passageway of the valve. Each disc has a pair of opposed radially extending wing-shaped openings formed through the disc. In one rotary position relative to each other, the openings in the discs align to allow water to flow through the discs and be dispensed from the faucet. However, when one of the discs is rotated ninety degrees relative to the other disc, the openings misalign and communication through the faucet is cut off. A rotatable valve stem extends into the valve and is operatively coupled to one of the discs to rotate it with respect to the other disc. The valve stem is provided with a knob that can be manually rotated through ninety degrees (thus the term "quarter turn" valve) to open up and close off the valve.

Such quarter turn rotary valves are an improvement over conventional valves and push button valves. However, they too have their problems. The bodies of these valves have been made of metal such as brass. In addition, the valve stem and other components of the valve have also been fabricated of metal. As discussed above, this poses a serious problem when dispensing purified or distilled water because the metal tends to dissolve or leach into the water, which contaminates the water and wears away the metal parts.

To combat the problem of metal corrosion, metal parts are sometimes plated with nickel or nickel chromium compounds. While this helps, it nevertheless does not solve the problems associated with metal valve parts. Further, fabricating valve parts of metal and plated metal is an expensive and time consuming process. Finally, these prior art quarter turn valves typically have had no means of limiting the flow of water through the valve to a rate less than that naturally provided by the size of the openings in the ceramic discs of the valve. Accordingly, auxiliary aerators or other means of limiting flow rate have been employed for this purpose.

Accordingly, there exists a need for an improved valve for use in purified drinking water faucets that does not leach metals or other compounds into the water, that is convenient and quick to use, and that includes built in self regulation of water flow rate for eliminating the need for auxiliary aerators or other regulators. Such a valve should be durable, and should withstand the torque and tensile forces imparted to it when it is installed in the base of a dispenser faucet. It is to the provision of such a valve that the present invention is primarily directed.

SUMMARY OF THE INVENTION

Briefly described, the present invention, in a preferred embodiment thereof, comprises a valve for use in a water dispensing faucet of the type used to dispense purified water for drinking and cooking. The water dispensing faucet has a base formed with a threaded receptacle, a water supply passageway terminating in a lip at the bottom of the receptacle, and a spigot passageway communicating with the receptacle intermediate its top and bottom.

The valve of this invention has an elongated generally tubular valve body formed of a non-metal preferably plastic material and the valve body has an upper end portion, a lower end portion, and a mid-section. The mid-section of the valve body is formed with threads for threading the valve into the treaded receptacle of the faucet base.

An elongated plastic valve stem is mounted for selective rotational movement within the central passageway of the valve body. The valve stem has an external portion that protrudes from the passageway at the upper end of the valve body for receiving a knob and an internal portion extending partially through the central passageway to a lower end of the valve stem. A pair of wings project radially from the valve stem in the region of the upper end portion of the valve body and a corresponding pair of stops protect inwardly from the walls of the passageway in the same region. The wings and stops are sized to engage one another to limit the range of rotation of the valve stem to ninety degrees or one quarter turn.

A pair of stacked ceramic discs are disposed in the lower end portion of the valve body and the bottom of the valve stem is coupled to one of the discs to rotate it relative to the other disc upon rotation of the valve stem. Wing shaped openings are formed through the discs. The openings are configured to align with each other to open the valve when the valve stem is rotated to its extreme limit on one direction and to misalign to close the valve when the valve stem is rotated to its extreme limit in the other direction.

A pair of windows are formed in the valve body in the region above the stacked discs for discharging water from the valve body when the disc openings are aligned and the valve is open. The windows communicate with the spigot passageway of the faucet to discharge water therethrough. The windows are sized to restrict the rate of water flow through the faucet to eliminate the need for external aerators or other flow limiting devices.

All components of the valve of this invention are molded of plastic to eliminate the leaching of metals into purified water dispensed from the faucet. The placement of the wings and stops in the upper portion of the valve body ensures maximum strength in the mid-section of the body, which must withstand substantial torque and tensile forces during and after installation. Finally, the size of the windows in the body provide a self regulating feature and aerators or other flow limiting devices are unnecessary.

These and other features, objects, and advantages of the invention will become more apparent upon review of the detailed description set forth below taken in conjunction with the accompanying drawings, which are briefly described as follows.

BRIEF DESCRIPTION OF THE DRAWINGS

FIG. 1 is a side elevational partially sectioned view of a valve that embodies principals of the present invention in a preferred form.

FIG. 2 is a side elevational exploded view of the valve of this invention illustrating various functional elements thereof.

DETAILED DESCRIPTION OF THE PREFERRED EMBODIMENT

Figure 3:
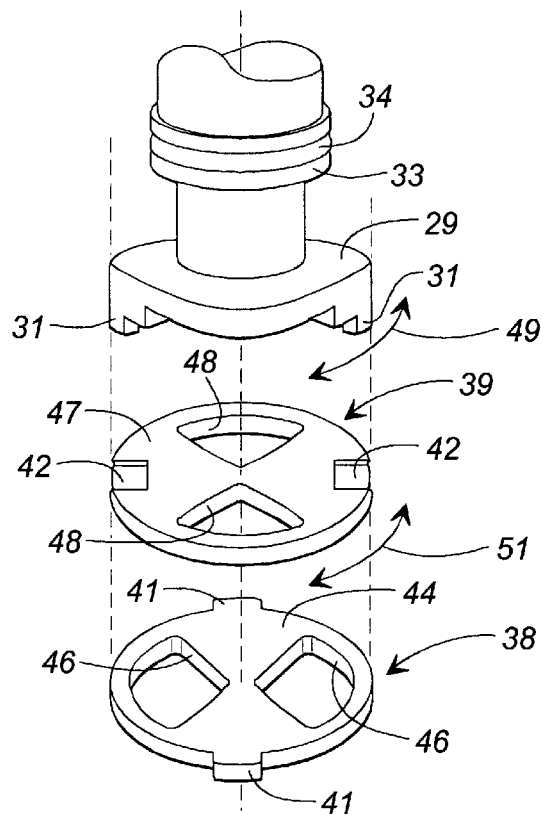
FIG. 3 is a perspective view of the ceramic discs of the valve showing the coupling thereof to the valve stem for rotating the discs for opening and closing the valve.

Referring now in more detail to the drawings, in which like numerals refer to like parts throughout the several views, FIGS. 1 and 2 illustrate a preferred embodiment of the valve of this invention shown in partially cross-sectional view and in an exploded view respectively. The valve 11 comprises a generally cylindrical valve body 12 having an upper portion 13, a lower portion 14 and a mid-section 16. The valve body 12 preferably is molded of a resilient plastic material such as, for example, an acetol copolymer plastic, and is formed with an axially extending central passageway 17. The passageway 17 is profiled to receive the various functional elements of the valve as described in more detail below. The upper portion 13 of the valve body 12 has an exterior shape (for example, hexagonal) to accommodate the wrench of a plumber for installing the valve in the base of a faucet. The lower portion 14 of the valve body has a substantially cylindrical outer profile and the mid-section 16 of the valve body is provided with threads 18 that are adapted to be received into the threaded valve receptacle of a faucet base for mounting the valve in the faucet. An annular flange 19 projects radially from the valve body just above the treads 18 and a rubber or latex O-ring 21 is disposed about the valve body immediately below the flange 19. The flange 19 and O-ring 21 function together to seat and seal the valve 12 within its receptacle in the faucet base as the valve is threadedly advanced into the receptacle.

An elongated valve stem 26 is disposed within the central passageway 17 of the valve body 12. The valve stem 26 has an external portion 27 that extends out the top of the valve body and that is contoured to receive a knob for manual rotation of the valve stem. The valve stem has an internal portion 28 that is disposed within the central passageway of the valve body. A lower end 29 of the internal portion 28 is generally disc-shaped and is formed with a pair of depending tangs 31 for purposes described in more detail below. A pair of O-ring retaining flanges 33 project radially outwardly from the valve stem above its lower end 29 and a similar flange 35 projects radially from the valve stem just above the O-ring retaining flanges. These retaining flanges together define a pair of axially spaced grooves for receiving and retaining a pair of rubber O-rings 34, as best illustrated in FIG. 1. The O-rings 34 bear slidably and seal against the interior wall of the passageway 17 and function to prevent water from seeping up the passageway and out the top of the valve during use.

A pair of opposed restricting wings 32 (only one is visible in FIGS. 1 and 2) project radially outwardly from the valve stem on opposite sides thereof. The restricting wings 32 extend upwardly from the upper restraining flange 35 and project outwardly from the valve stem in the region of the hexagonal upper portion of the valve body. A corresponding pair of radially opposed stops 52 (only one of which is visible in FIGS. 1 and 4) project inwardly from the wall of the passageway and are axially aligned with the restricting wings 32 on the valve stem. The restricting wings 32 and the stops 52 are appropriately sized and positioned so that they engage one another as the valve stem rotates and thus restricts rotational movement of the valve stem 26 to ninety degrees or, in other words, a quarter turn of the valve stem. When the valve stem is rotated to its extreme counterclockwise position, the restricting wings 32 abut one side of the stops 52 to define the limit of rotational movement of the valve stem In the counterclockwise direction. Similarly, when the valve stem is rotated to its extreme clockwise position, the restricting wings abut the other side of the stops to define the limit of rotational movement of the valve stem in the clockwise direction. Rotational movement of the valve stem is thus limited to a quarter turn.

Placement of the restricting wings and the stops in the upper portion of the valve body rather than in the mid-section as with prior art metal valves is an important distinction. This is because the mid-section of the valve is subject to the substantial torque applied when the valve is threaded into place with a wrench and thereafter to the continuing tensile forces generated by the threads that hold the valve firmly in place. Thus, the mid-section of the valve is under substantial strain. The positioning and operation of the restricting wings and inwardly projecting stops in this region of the valve could weaken the region because of the uneven flow of plastic that would be caused during the molding process. Further, the repetitive engagement of the wings and stops during normal operation of the valve could impart additional and repetitive shear forces to the mid-section that might eventually lead to failure of the valve. With the wings and stops positioned in the upper portion of the valve body, this problem is effectively eliminated.

A pair 37 of stacked ceramic discs comprising a lower disc 38 and an upper disc 39 are located in the lower portion of the valve body as best illustrated in FIG. 1. The discs 38 and 39 are of a construction that is known in the art and function to open up and close off the valve of the present invention. More specifically, the lower disc 38 has a polished upper surface 44 and a pair of opposed wing-shaped openings 46 are formed through the disc. The lower disc 38 is also formed with a pair of opposed radially projecting tabs 41 for purposes described in more detail below.

The upper ceramic disc 39 has a bottom surface (not shown) that is polished like the top surface 44 of the lower disc and, like the lower disc, is formed with a pair of radially opposed wing-shaped openings 48. The openings 46 and 48 are shaped and sized so that when the discs are oriented relative to each other as illustrated in FIG. 3, the openings in the upper disc are misaligned with the openings in the lower disc. However, when the upper disc is rotated through ninety degrees relative to the lower disc as indicated by arrow 51, the openings 48 in the upper disc align with the openings 46 in the lower disc. With this configuration, it will be seen that when the discs are stacked together in the passageway as shown in FIG. 1 with there polished surfaces flat against each other, misalignment of the openings 48 in the upper disc with the openings 46 in the lower disc closes off communication through the openings in the lower disc. Conversely, when the upper disc is rotated so that its openings align with those of the lower disc, communication through the openings of the lower disc is established and water can flow therethrough. It is thus through the relative rotation of these two discs that the valve of this invention is opened and closed.

The top surface 47 of the upper disc 39 is formed with a pair of radially opposed detents 42. As illustrated in FIG. 1, the detents 42 are sized and positioned to receive and mate with the depending tangs 31 formed on the lower end 29 of the valve stem 26. The bottom surface of the lower end 29 is formed with a stepped configuration as shown in FIG. 3 so that when the tangs 31 are engaged within the detents 42, a space is provided between the top surface 47 of the upper disc 39 and the bottom of the lower end 29 of the valve stem 26. As best illustrated in FIG. 1, the upper disc is installed in the lower portion of the valve body with its detents engaged with the depending tangs of the valve stem. The lower disc 38 is then installed beneath the upper disc with the polished surfaces of the discs resting flat against each other. When so installed, the tabs 41 of the lower disc are received in the corresponding detents 53 in the passageway wall so that the lower disc is prevented from rotating within the passageway.

With this configuration of the discs, it will be understood that rotation of the valve stem causes corresponding rotation of the upper ceramic disc 39 relative to the lower ceramic disc. When the valve stem is rotated to its extreme counterclockwise position, the openings in the discs are completely misaligned and when the valve stem is rotated to its extreme clockwise position, the openings are completely aligned. Thus, rotation of the valve stem in the clockwise direction opens the valve and rotation through a quarter turn in the counterclockwise direction closes the valve. The polished surfaces of the discs assures that when their openings are misaligned, a complete seal is created an no water seeps between the discs to escape from the faucet.

Figure 5:
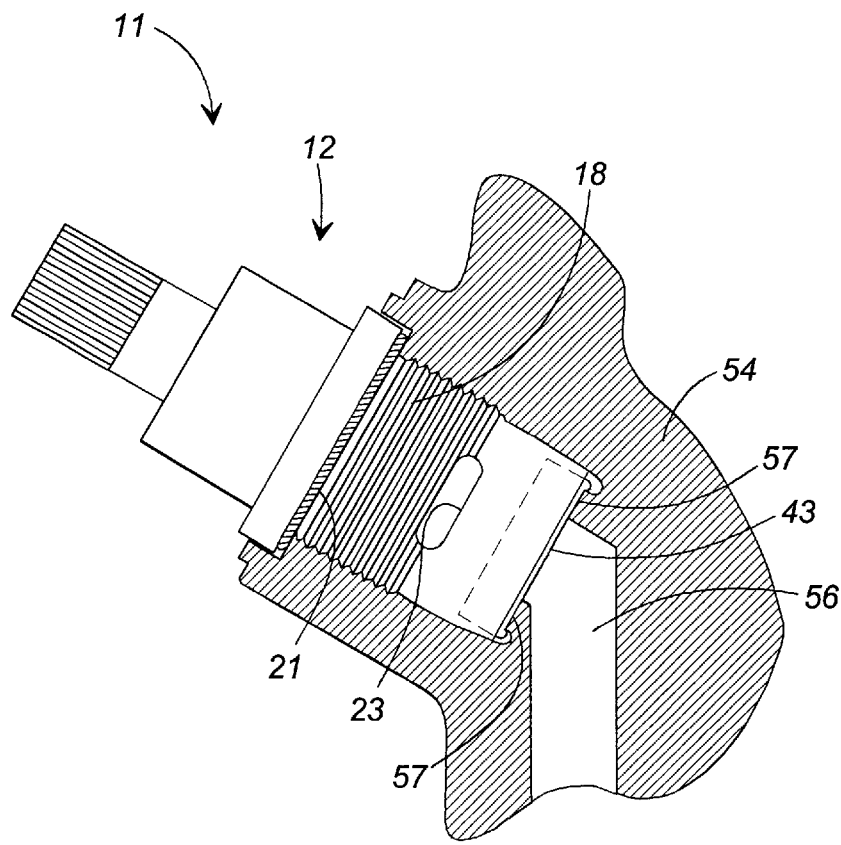
FIG. 5 is a partially sectioned view of the valve of this invention shown installed in the base of a faucet.

An annular washer or seal 43, which is preferably made of a synthetic latex material, is sized to be received in the bottom recess of the central passageway of the valve body. The seal 43 is sized so that a portion of its top surface projects inwardly and underlies the periphery of the lower ceramic disc 38 to hold the lower disc in place against the upper disc 39. The seal 43 is also sized so that it projects slightly below the lower rim of the valve body as best illustrated in FIG. 5. The seal 43 fits snugly within the bottom of the passageway so that it is held securely in place by friction prior to installation of the valve in a faucet to hold the discs and valve stem in their proper positions within the valve body.

A pair of radially opposed circumferentially extending slots or windows 22 and 23 are formed through the valve body just below the threads 38 on the mid-section of the body. As best illustrated in FIG. 1, the windows 22 and 23 are located to align axially with the space defined between the upper ceramic disc 39 and the bottom of the lower end 29 of the valve stem 26. The windows 22 and 23 also align with the spigot passageway of a faucet when the valve is fully installed in the faucet. In this way, when the valve is opened, water flows through the ceramic discs, into the space between the upper disc and the bottom of the valve system, and enters the spigot passageway through the windows 22 and 23 for dispensing from the spigot. The windows 22 and 23 are sized to regulate the flow of water therethrough to a predetermined maximum rate that preferably is selected to be appropriate for filling drinking glasses and the like. In this way, the valve of this invention is self regulating so that it delivers a uniform non-aerated stream of water at just the right flow rate for its purpose.

Figure 4:
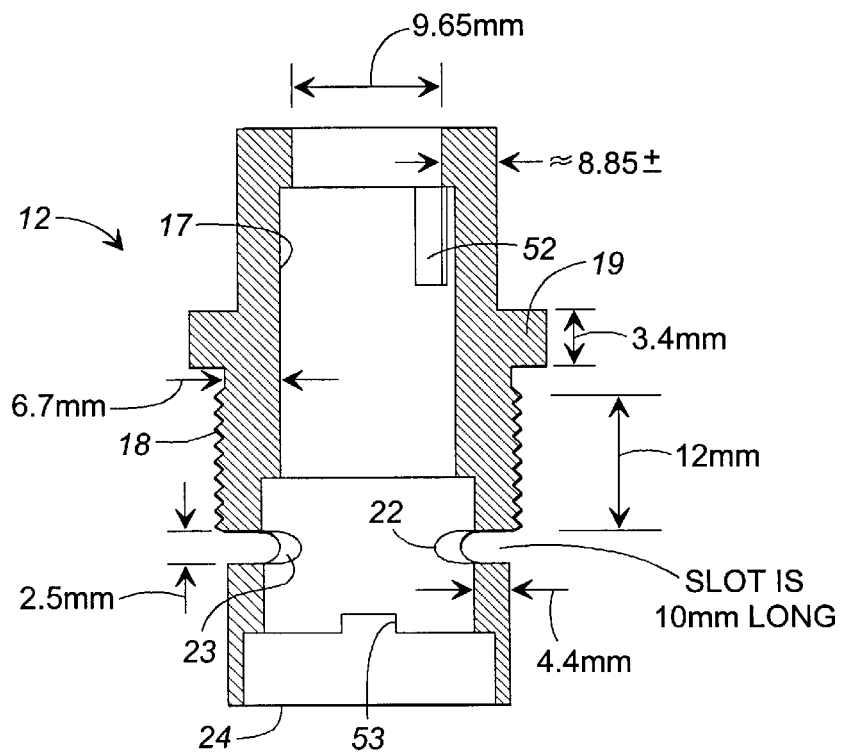
FIG. 4 is a cross sectional view of the valve body of this invention showing the unique sizing and component placement thereof.

FIG. 4 illustrates the various dimensions of the valve body of this invention required for the valve to function as a direct replacement for the metal valves of the prior art. The inventors have discovered through substantial experimentation that a 6.7 mm wall thickness in the mid-section of the body in conjunction with a 3.4 mm thick flange 19, a 12 mm span of threads, and the movement of the restricting wings 32 and corresponding stops 52 to the upper non-stressed portion of the valve body allows an all plastic valve to withstand the torque and continuing tensile forces imparted to the valve body when it is installed in the base of a faucet. The regulating windows 22 and 23 are formed with a width of 2.5 mm and a length of approximately 10 mm. It has been found that this size window provides a stream of water from the spigot that is properly regulated for the filling of drinking glasses. Thus, auxiliary aerators and other regulators are not needed. As a matter of fact, aerators are undesirable on purified water dispensers because they tend to introduce air bubbles into the water and these bubbles can affect the taste of the water. With the present invention, an appropriately regulated stream is provided that causes minimum agitation of the water as it is dispensed and introduces very few air bubbles.

The various other dimensions shown in FIG. 4 are self explanatory and need not be discussed separately in detail here. However, it should be noted that the bottom recess of the valve body that receives the seal 43 is slightly outwardly flared for purposes explained in more detail below.

Figure 6:
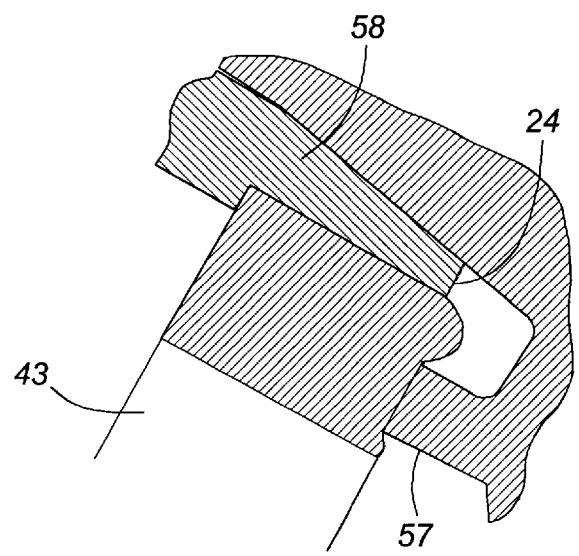
FIG. 6 is a cross sectional illustration showing the sealing of the valve seat against the mouth of the water supply passageway within the vase of a faucet in which the valve is installed.

FIGS. 5 and 6 illustrate the valve of this invention as it appears installed in the base of a purified water faucet. For installation, the valve is simply rotated with a wrench into the threaded receptacle of the faucet base. As the valve advances into the receptacle, its O-ring 21 eventually contacts the seating surface around the mouth of the receptacle and, at about the same time, the seal 43 contacts the lip 57 around the end of the water supply passageway 56. As the valve is tightened further, the threads 18 draw the flange 19 against the O-ring 21, which becomes compressed between the flange and the seating surface to seal the valve within the receptacle. At the same time (FIG. 6) the seal 43 is compressed down against the lip 57 of the water supply passageway to seat and seal against any leakage of water past the seal. In this regard, the lowest bottom of many common valve receptacles is tapered slightly inwardly as shown in FIG. 6. This configuration works in conjunction with the slightly outwardly flared bottom recess of the valve body by compressing the lowest extent of the valve body in against the seal 43 as the valve is tightened in place. This, in turn, compresses the seal radially at the same time that it is being compressed axially against the lip of the supply passageway, thus compressing the seal tightly against the lip from both directions.

The valve of this invention is also slightly shorter than its metal counterparts, which are designed to bottom out in the faucet receptacle when tightened in place. Such bottoming is to be avoided with a plastic valve because it could create sudden shear forces during installation that could well deform or destroy the valve. The just described dual direction compression of the seal 43 provides a water proof seal that is as secure as that achieved with a metal valve while avoiding potentially damaging smear forces caused by bottoming.

In operation, the valve of the present invention, when installed in a faucet, functions in much the same way as a prior art metal valve. For dispensing water, the knob attached to the projecting outer end of the valve stem is rotated a quarter turn in the clockwise direction. This aligns the openings in the ceramic discs to permit water to flow through the discs and through the regulating windows into the spigot passageway (which can extend out of the page in FIG. 5) from which it is dispensed. Rotation of the valve stem a quarter turn back in the counterclockwise direction misaligns the openings in the discs to shut off the valve and shut off the flow of water from the spigot.

Since the valve of this invention has no metal parts, there is no leaching of metal or metal oxides into the water dispensed from the faucet and no consequent deterioration of the metal components. The self-regulating nature of the valve eliminates the need for auxiliary aerators and regulators and dispenses water at an optimum rate for filling drinking glasses and cooking vessels.

The invention has been described herein in terms of a preferred embodiment. It will be understood by those of skill in the art that various additions, deletions, and modifications might well be made to the illustrated embodiments without departing from the spirit and scope of the invention as set forth in the claims.

We claim:

1. A valve for use in a water dispensing faucet having a base formed with a threaded valve receptacle, a water supply passageway terminating in a lip at the bottom of the receptacle, and a spigot passageway communicating with the receptacle intermediate its top and bottom, said valve comprising;

an elongated generally tubular unitary valve body formed of non-metal material, said valve body having an upper end portion, a lower end portion, and a mid-section;

said valve body having walls of a predetermined thickness that define an axially extending passageway of said valve body, said passageway extending between said upper end portion and said lower end portion of said valve body;

said mid-section of said valve body being formed with external threads for treading said valve into the treaded receptacle of the faucet base;

an elongated non-metal valve stem mounted for selective rotational movement within said central passageway, said valve stem having an external portion protruding from said passageway at said upper end of said valve body for receiving a knob, and an internal portion disposed within said axially extending passageway and terminating in a lower end of said valve stem;

restricting means located within said central passageway adjacent the upper end portion of said valve body for restricting rotational movement of said valve stem to predetermined range;

a pair of stacked ceramic discs including a top disc and a bottom disc disposed in said central passageway at said lower end portion of said valve body, each of said discs being formed with openings that are configured to be aligned to open communication through said pair of discs when said discs are in a first rotary orientation relative to each other and misaligned to close communication through said pair of discs when said discs are in a second rotary orientation relative to each other;

means for holding said bottom disc in a fixed rotary orientation relative to said valve body;

means for roatably coupling said lower end of said valve stem to said top disc so that said top disc is rotated relative to said bottom disc upon rotation of said valve stem, said predetermined range of rotation of said valve stem being selected to rotate said top disc between said first rotary orientation to open said valve and said second rotary orientation to close said valve as said valve stem is rotated through said predetermined range;

at least one window formed through said valve body at a location above said top disc for discharging water from said valve body when said valve is open, said window being aligned to communicate with the spigot passageway in the faucet when said valve is installed in the faucet base; and sealing means in said lower end of said valve body for sealing said valve against the lip of the water supply passageway with the lower end of the valve body passageway communicating with the water supply passageway in the faucet base when said valve is threaded into base of the faucet.

* * * * *